United States Patent
Park

(10) Patent No.: US 10,412,764 B2
(45) Date of Patent: Sep. 10, 2019

(54) MULTIPLE FRAME TRANSMISSION

(71) Applicant: FRONTSIDE, Seongnam (KR)

(72) Inventor: Jong Hoon Park, Namyangju (KR)

(73) Assignee: FRONTSIDE, Seongnam (KR)

( * ) Notice: Subject to any disclaimer, the term of this patent is extended or adjusted under 35 U.S.C. 154(b) by 0 days.

(21) Appl. No.: 15/718,870

(22) Filed: Sep. 28, 2017

(65) Prior Publication Data

US 2018/0092127 A1    Mar. 29, 2018

(30) Foreign Application Priority Data

Sep. 28, 2016  (KR) .......... 10-2016-0125095
Nov. 3, 2016   (KR) .......... 10-2016-0145940
Jan. 31, 2017  (KR) .......... 10-2017-0013487

(51) Int. Cl.
*H04W 72/04*   (2009.01)
*H04W 74/08*   (2009.01)
*H04W 84/12*   (2009.01)
*H04W 88/08*   (2009.01)

(52) U.S. Cl.
CPC ... *H04W 74/0816* (2013.01); *H04W 72/0453* (2013.01); *H04W 72/0486* (2013.01); *H04W 84/12* (2013.01); *H04W 88/08* (2013.01)

(58) Field of Classification Search
CPC ......... H04W 74/0816; H04W 72/0453; H04W 88/08; H04W 72/0486; H04W 84/12; H04W 28/20; H04W 72/0406; H04W 88/02; H04W 74/002; H04L 5/0064; H04L 5/0092; H04L 5/001; H04L 5/0028; H04L 5/0023; H04L 5/0041
See application file for complete search history.

(56) References Cited

U.S. PATENT DOCUMENTS

| | | | |
|---|---|---|---|
| 2013/0229996 A1* | 9/2013 | Wang ............... | H04W 72/0413 370/329 |
| 2015/0373587 A1* | 12/2015 | Josiam ............. | H04W 28/20 370/338 |
| 2016/0113009 A1* | 4/2016 | Seok ................ | H04B 7/0452 370/329 |
| 2017/0006635 A1* | 1/2017 | Huang ............. | H04W 74/0816 |
| 2017/0055290 A1* | 2/2017 | Lv ................... | H04W 74/0816 |
| 2017/0339692 A1* | 11/2017 | Chun ............... | H04L 1/0003 |

* cited by examiner

*Primary Examiner* — Jung Liu

(57) ABSTRACT

A method for transmitting a physical layer protocol data unit (PPDU) in a transmission opportunity (TXOP) and a device using the same are provided. The device transmits a request to send (RTS) frame to a plurality of receiving stations. The RTS frame includes a bandwidth field and a plurality of allocation fields. The bandwidth field indicates a first bandwidth in which the RTS frame is transmitted. Each allocation field indicates a bandwidth in which a clear to send (CTS) frame is to be sent by a corresponding receiving station. The device determines a transmission bandwidth of a PPDU to be sent by comparing the first bandwidth with a second bandwidth which is a total bandwidth indicated by the plurality of allocation fields.

11 Claims, 11 Drawing Sheets

MULTIPLE FRAME TRANSMISSION

CROSS-REFERENCE TO RELATED APPLICATIONS

This application claims the benefit of priority of Korean Patent Application Nos. 10-2016-0125095 filed on Sep. 28, 2016, 10-2016-0145940 filed on Nov. 3, 2016, and 10-2017-0013487 filed on Jan. 31, 2017, all of which are incorporated by reference in their entirety herein.

BACKGROUND OF THE INVENTION

Field of the Invention

The present invention relates to wireless communication and, more particularly, to a method and device for transmitting a data unit in a wireless local area network.

Related Art

Institute of Electrical and Electronics Engineers (IEEE) 802.11 based wireless local area networks (WLANs), the most popular and successful indoor wireless solutions, have evolved as a key enabling technology to cover medium to large scale enterprises, public area hot-spots, apartment complexes, and are ubiquitous in the modern world.

High Efficiency (HE) WLAN (e.g., IEEE 802.11ax) improves a spectrum efficiency and an area throughput in a dense environment. Especially, in an indoor or an outdoor environment, a purpose of the HE WLAN is to improve a performance when a lot of access points (APs) and stations (STAs) are competing.

Since a lot of APs and STAs are competing, an improved protection mechanism to prevent a collision due to simultaneous transmissions of STAs is required.

SUMMARY OF THE INVENTION

The present invention provides a method and device for transmitting a physical layer protocol data unit (PPDU) in a transmission opportunity (TXOP).

In an aspect, the method includes transmitting, by a transmitting station, a request to send (RTS) frame to a plurality of receiving stations, the RTS frame including a bandwidth field and a plurality of allocation fields, the bandwidth field indicating a first bandwidth in which the RTS frame is transmitted, each allocation field indicating a bandwidth in which a clear to send (CTS) frame is to be sent by a corresponding receiving station, receiving, by the transmitting station, a plurality of clear to send (CTS) frames as a response to the RTS frame from the plurality of receiving stations, determining, by the transmitting station, a transmission bandwidth of a PPDU to be sent by comparing the first bandwidth with a second bandwidth which is a total bandwidth indicated by the plurality of allocation fields, and transmitting, by the transmitting station, the PPDU in the determined transmission bandwidth.

When a value of the first bandwidth is equal to a value of the second bandwidth, a value of the transmission bandwidth of the PPDU may be set to a value that is equal to or smaller than the value of the first bandwidth.

When the value of the first bandwidth is not equal to the value of the second bandwidth, the value of the transmission bandwidth of the PPDU may be set to a value that is equal to or smaller than a value of a third bandwidth in which a preceding PPDU is transmitted by the transmitting station.

In another aspect, the device includes a transceiver configured to receive and transmit radio signals, and a processor coupled with the transceiver. The processor is configured to control the transceiver to transmit a request to send (RTS) frame to a plurality of receiving stations, the RTS frame including a bandwidth field and a plurality of allocation fields, the bandwidth field indicating a first bandwidth in which the RTS frame is transmitted, each allocation field indicating a bandwidth in which a clear to send (CTS) frame is to be sent by a corresponding receiving station, control the transceiver to receive a plurality of clear to send (CTS) frames as a response to the RTS frame from the plurality of receiving stations, determine a transmission bandwidth of a PPDU to be sent by comparing the first bandwidth with a second bandwidth which is a total bandwidth indicated by the plurality of allocation fields, and control the transceiver to transmit the PPDU in the determined transmission bandwidth.

DESCRIPTION OF EXEMPLARY EMBODIMENTS

Figure 1:
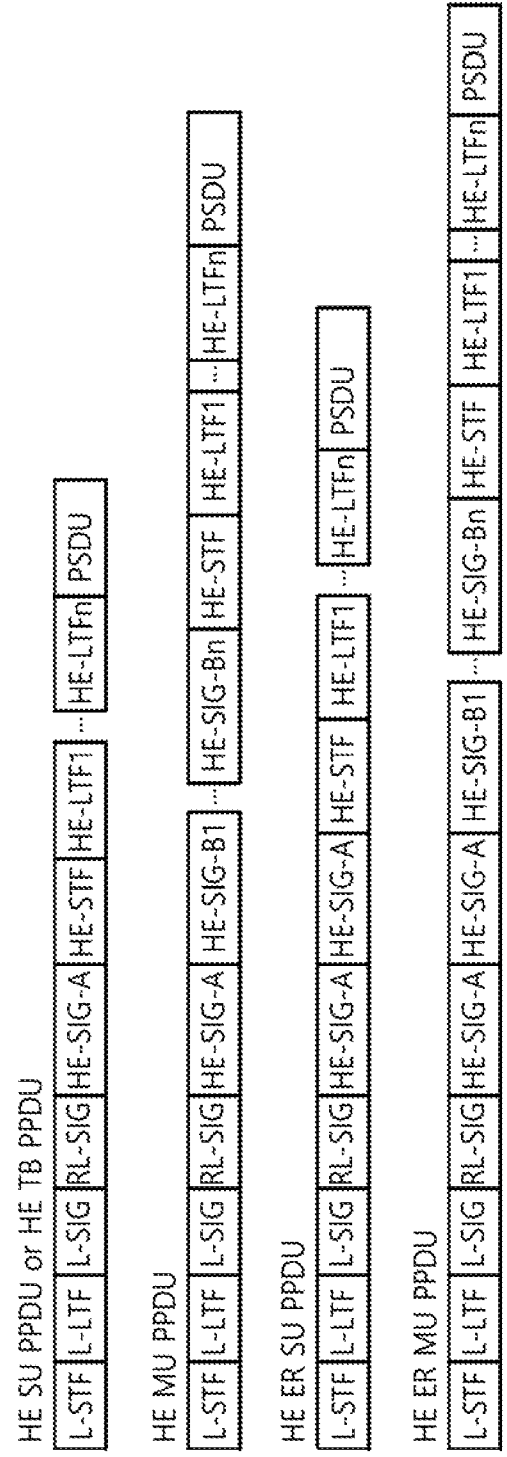
FIG. 1 shows various formats for HE PPDU.

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11 a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency (HE) system. A WLAN system supporting systems used before the HE system is released is referred to as a legacy system. The HE system may include an HE Station (STA) and an HE Access Point (AP). The term HE is only for the purpose of distinguishing from the conventional WLAN, and there is no restriction thereon. The HE system may support IEEE 802.11/a/g/n/ac by providing backward compatibility in addition to the proposed method.

Unless a function of a station (STA) is additionally distinguished from a function of an Access Point (AP), the STA may include a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission. A basic service set (BSS) may include a set of STAs that have successfully synchronized with an AP. A basic service set identifier (BSSID) is a 48 bits identifier of a corresponding BSS. An overlapping basic service set (OBSS) may be a BSS operating on the same channel as the STA's BSS. The OBSS is one example of different BSS with the STA's BSS.

Enhanced Distributed Channel Access (EDCA) channel access protocol is derived from the Distributed Coordination Function (DCF) procedures by adding four independent enhanced distributed channel access functions (EDCAFs) to provide differentiated priorities to transmitted traffic, through the use of four different access categories (ACs).

Each EDCAF shall maintain a backoff timer, which has a value measured in backoff slots. When the backoff procedure is invoked, the backoff timer is set to an integer value chosen randomly with a uniform distribution taking values in the range [0,CW[AC]] inclusive. The duration AIFS[AC] is a duration derived from the value AIFSN[AC] by the relation:AIFS[AC]=AIFSN[AC]×aSlotTime+aSIFSTime.

In an infrastructure BSS, AIFSN[AC] is advertised by an AP in the EDCA Parameter Set element in Beacon and Probe Response frames transmitted by the AP. The value of AIFSN [AC] shall be greater than or equal to 2 for non-AP STAs. The value of AIFSN[AC] shall be greater than or equal to 1 for APs. An EDCA transmission opportunity (TXOP) which is an interval of time during which a STA has the right to initiate frame exchange sequences onto a wireless medium is granted to an EDCAF when the EDCAF determines that it shall initiate the transmission of a frame exchange sequence.

Physical and virtual Carrier sense (CS) functions are used to determine the state of the wireless medium. When either function indicates a busy medium, the medium shall be considered busy; otherwise, it shall be considered idle.

A physical CS mechanism shall be provided by the physical layer (PHY). A virtual CS mechanism shall be provided by the Medium Access Control (MAC) layer. This mechanism is referred to as the network allocation vector (NAV). The NAV maintains a prediction of future traffic on the medium based on duration information that is announced in Request-to-Send (RTS)/Clear-to-Send (CTS) frames prior to the actual exchange of data. The duration information is also available in the MAC headers of all frames sent during the contention period other than PS-Poll frames.

The CS mechanism combines the NAV state and the STA's transmitter status with physical CS to determine the busy/idle state of the medium. The NAV may be thought of as a counter, which counts down to 0 at a uniform rate. When the counter is 0, the virtual CS indication is that the medium is idle; when the counter is nonzero, the indication is busy. The medium shall be determined to be busy when the STA is transmitting.

A STA that receives at least one valid frame in a Physical layer Service Data Unit (PSDU) can update its NAV with the information from any valid Duration field in the PSDU. When the received frame's receiver address (RA) is equal to the STA's own MAC address, the STA shall not update its NAV. For all other received frames the STA shall update its NAV when the received Duration is greater than the STA's current NAV value. Upon receipt of a PS-Poll frame, a STA shall update its NAV settings as appropriate under the data rate selection rules using a duration value equal to the time, in microseconds, required to transmit one Ack frame plus one Short Interframe Space (SIFS), but only when the new NAV value is greater than the current NAV value. If the calculated duration includes a fractional microsecond, that value is rounded up to the next higher integer. Various additional conditions may set or reset the NAV. When the NAV is reset, a PHY-CCARESET.request primitive shall be issued. This NAV update operation is performed when the PHY-RXEND.indication primitive is received. The PHY-RXEND.indication primitive is an indication by the PHY to the local MAC entity that the PSDU currently being received is complete.

The PHY-RXEND.indication primitive is generated by the PHY for the local MAC entity to indicate that the receive state machine has completed a reception with or without errors. When a Signal Extension is present, the primitive is generated at the end of the Signal Extension. A RXERROR parameter of The PHY-RXEND.indication primitive provides error conditions. When the RXERROR parameter is set to 'NoError', no error occurred during the receive process in the PHY. When the RXERROR parameter is set to 'Filtered', during the reception of the PPDU, the PPDU was filtered out due to a condition set in the PHYCON-FIG_VECTOR. In the case of an RXERROR value of NoError, the MAC uses the PHY-RXEND.indication primitive as reference for channel access timing.

FIG. 1 shows various formats for HE PPDU.

HE single user (SU) PPDU, HE trigger-based (TB) PPDU and HE extended range (ER) SU PPDU format are destined for a single STA. HE multi-user (MU) PPDU and HE ER MU PPDE are destined for the plurality of STAs.

HE PPDU may include Non-HT Short Training field (L-STF), Non-HT Long Training field (L-LTF), Non-HT SIGNAL field (L-SIG), Repeated Non-HT SIGNAL field (RL-SIG), HE Signal A field (HE-SIG-A), HE Signal B field (HE-SIG-A), HE Short Training field (HE STF), HE Long Training field (HE LTF) and a Data field. The Data field may include a Physical layer service data unit (PSDU).

The L-SIG is used to communicate rate and length information. The L-SIG may include a LENGTH field and a RATE field. The RATE field may be set to the value representing 6 Mb/s in the 20 MHz channel. The LENGTH field may be set to the value given by the following equation:

$$\text{LENGTH} = \left\lceil \frac{TXTIME - 20}{4} \right\rceil \times 3 - 3 - m \qquad \text{[Equation 1]}$$

where m is 1 for HE MU PPDU and HE ER SU PPDU, and m is 2 otherwise.

The HE-SIG-A may include at least one of following fields. The number of bits is exemplary purpose only.

TABLE 1

| Field | Number of bits | Description |
|---|---|---|
| UL/DL | 1 | Indicates whether the PPDU is sent UL or DL: i.e. Set to 0 for DL, Set to 1 for UL |
| Format | 1 | Differentiate an HE SU PPDU from an HE TB PPDU: i.e. Set to 0 for HE TB PPDU, Set to 1 for HE SU PPDU |
| BSS Color | 6 | The BSS Color field is an identifier of the BSS |
| Bandwidth | 2 | Bandwidth over which this PPDU is transmitted. |
| Modulation and Coding Scheme (MCS) | | Indicated a MCS of the Data Field |
| TXOP Duration | | Indicates the remaining duration of the TXOP after the transmission. Set to a value to indicate duration information for NAV setting and protection of the TXOP. |
| Spatial Reuse | | Indicates whether or not spatial reuse is allowed during the transmission of this PPDU, and if allowed, indicates a value that is used to determine a limit on the transmit power of a spatial reuse transmission. |

Table 2 shows timing related constants of HE PPDU

TABLE 2

| Parameter | Values | Description |
|---|---|---|
| $T_{SYM}$ | 13.6 µs, 14.4 µs or 14.4 µs depending on the GI used | Symbol interval |
| $T_{L-STF}$ | 8 µs | Non-HT Short Training field duration |
| $T_{L-LTF}$ | 8 µs | Non-HT Long Training field duration |
| $T_{L-SIG}$ | 4 µs | Non-HT SIGNAL field duration |
| $T_{RL-SIG}$ | 4 µs | Repeated non-HT SIGNAL field duration |
| $T_{HE-SIG-A}$ | 8 µs | HE Signal A field duration in normal mode |
| $T_{HE-SIG-A-R}$ | 8 µs | HE Signal A field duration in repetition/low rate mode |
| $T_{HE-STF-T}$ | 8 µs = 5 × 1.6 µs | HE Short Training field duration for trigger-based PPDU |
| $T_{HE-STF-NT}$ | 4 µs = 5 × 0.8 µs | HE Short Training field duration for non-trigger-based PPDU |
| $T_{HE-LTF}$ | $T_{HE-LTF-1X}$, $T_{HE-LTF-2X}$ or $T_{HE-LTF-4X}$ depending upon the LTF duration used | Duration of each HE-LTF symbol without GI |
| $T_{HE-LTE-1X}$ | 3.2 µs | Duration of each 1x HE-LTF symbol without GI |
| $T_{HE-LTF-2X}$ | 6.4 µs | Duration of each 2x HE-LTF symbol without GI |
| $T_{HE-LTF-4X}$ | 12.8 µs | Duration of each 4x HE-LTF symbol without GI |
| $T_{HE-SIG-B}$ | 4 µs = 3.2 µs + $T_{GI,Pre-HE}$ | Duration of each HE-SIG-B symbol |
| $T_{PE}$ | 0, 4 µs, 8 µs, 12 µs, 16 µs depending on actual extension duration used | Duration of Packet Extension field |
| $N_{service}$ | 16 | Number of bits in the SERVICE field |
| $N_{tail}$ | 6 | Number of tail bits per BCC encoder |

An HE STA updates the NAV depending on the timing of PHY_RXEND.indication primitive occurred from the received PPDU. If PHY-RXEND.indication primitive is occurred at the end of the PSDU, the NAV is set to either TXOP Duration value indicated in HE-SIG-A or Duration value indicated in MAC header. When the CRC of the MSDU is passed, the NAV is set to the Duration value indicated in MAC header. When the CRC of the MSDU is failed, the NAV is set to the TXOP Duration value indicated in HE-SIG-A.

If PHY-RXEND.indication primitive is occurred before the end of PSDU, the NAV is set to TXOP Duration value plus a remaining time until the end of PSDU. The remaining time until the end of PSDU is varied depending on the received HE PPDU Type and/or a direction of frame. Filtering out a received PPDU is happened when a STA finds out that it is not a recipient STA. That detection timing is varied depending on the received HE PPDU.

If the received signal strength is less than OBSS Packet Detection (OBSS PD) Threshold, RXVECTOR parameter TXOP_DURATION is set to 0 because a STA ignores the NAV update. A STA does not update its NAV when the received Duration is less than or equal to the STA's current NAV value.

Figure 2:
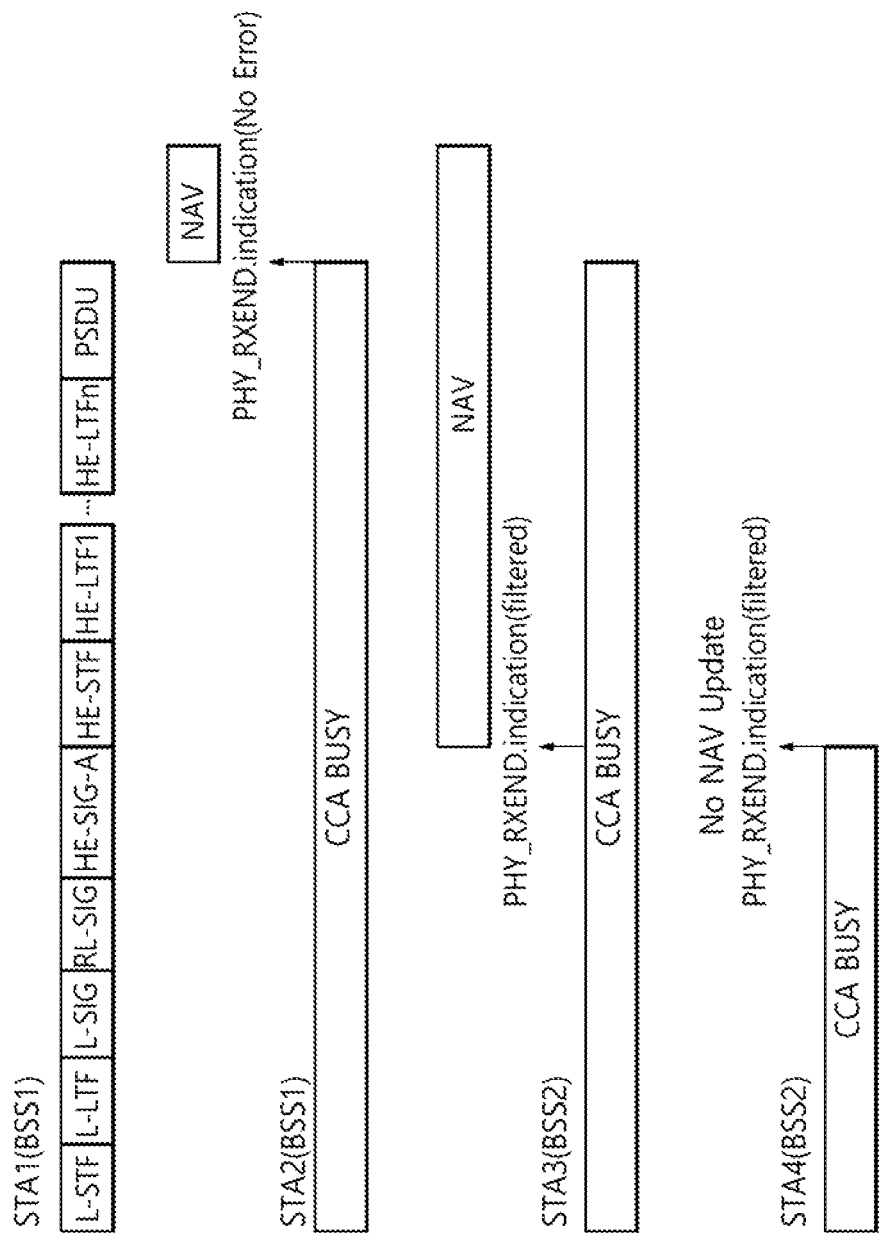
FIG. 2 shows the NAV procedure of HE STA after receiving HE SU PPDU or HE TB PPDU.

FIG. 2 shows the NAV procedure of HE STA after receiving HE SU PPDU or HE TB PPDU.

In a HE SU/TB PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE\_PREAMBLE} + T_{SYM} N_{SYM} + T_{PE}.$$

In STA 2, because PHY-RXEND.indication primitive and PHY-TXOP.indication primitive are occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RX- END.indication primitive is occurred after HE-SIG-A for a power saving purpose. But, for a protection mechanism, PHY-TXOP.indication primitive is occurred at the end of the RXTIME.

The NAV of STA 3 is set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

Figure 3:
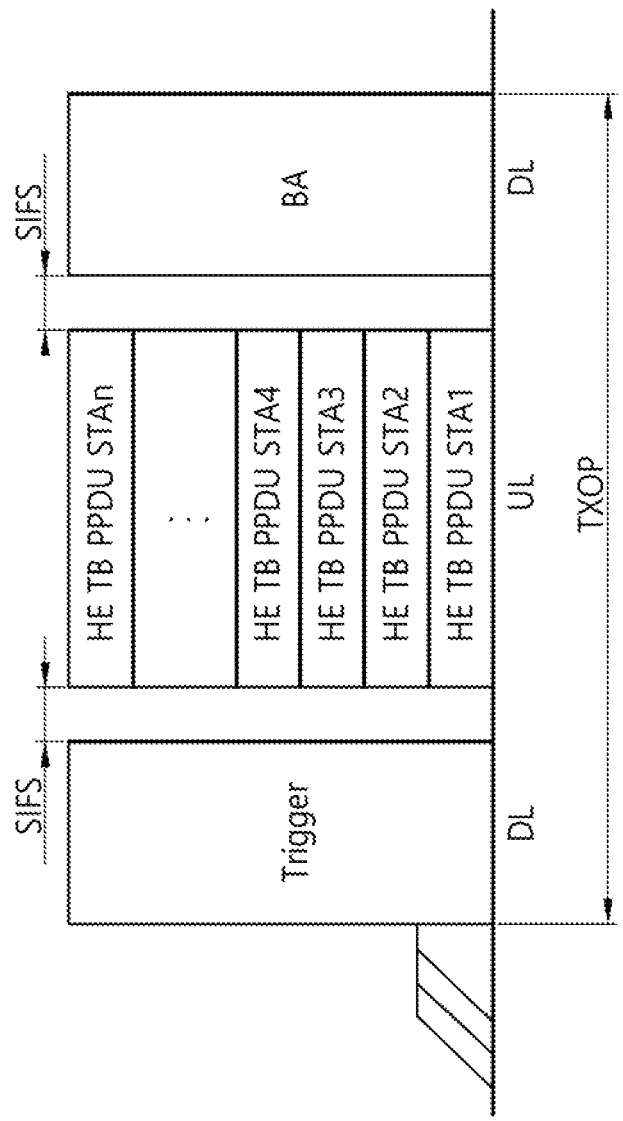
FIG. 3 shows an example of uplink multi-user operation.

FIG. 3 shows an example of uplink multi-user operation.

The UL MU operation allows an AP to solicit simultaneous immediate response frames from one or more non-AP STAs. Non-AP STAs transmit their response frames using HE TB PPDU, in either UL OFDMA, UL MU-MIMO, or both.

An AP transmits a Trigger frame to a plurality of recipient STAs. The Trigger frame requests a transmission of HE TB PPDU. The Trigger frame solicits and allocates resources for UL MU transmissions a SIFS after the PPDU that carries the Trigger frame. The Trigger frame may include one or more User Info fields addressed to the recipient STAs. The inter frame space between a PPDU that contains a Trigger frame and the HE TB PPDU is SIFS. If a Trigger frame is aggregated with other frames in an Aggregated-MAC Protocol Data Unit (A-MPDU), the Trigger frame shall be the first frame in the A-MPDU.

An AP shall not set any subfields of the Common Info field to a value that is not supported by all the recipient STAs of the Trigger frame. An AP shall not set any subfields of a User Info field to a value that is not supported by the recipient STAs of the User Info field.

A recipient STA may commence the transmission of an HE TB PPDU at the SIFS time boundary after the end of a received PPDU, when the received PPDU contains a Trigger frame with a User Info field addressed to the recipient STA. The User Info field is addressed to a STA if the User Identifier subfield is equal to the association identifier (AID) of the STA and the STA is associated with the AP.

After receiving a plurality of HE TB PPDUs from the plurality of STAs, the AP may transmits a block acknowledgement (BA) frame for acknowledging the plurality of HE TB PPDUs to the plurality of recipient STAs.

Figure 4:
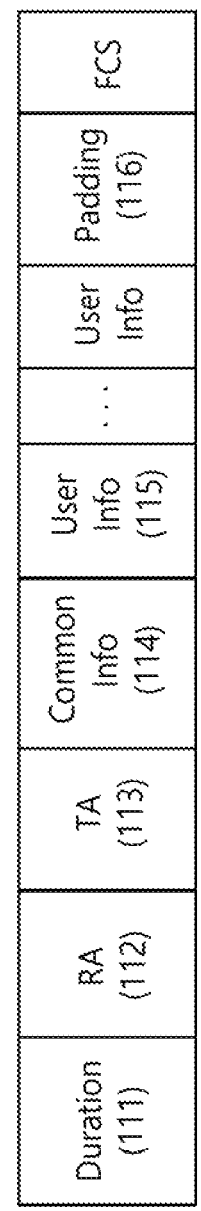
FIG. 4 shows a format of Trigger frame.

FIG. 4 shows a format of Trigger frame.

A Duration field 111 is set to the remaining duration of the TXOP. The Duration field 111 may be set to the estimated time required to transmit the solicited HE TB PPDU, plus the estimated time required to transmit the acknowledgement for the solicited HE TB PPDU, plus applicable SIFSs.

A receiver address (RA) field 112 is the address of the recipient STA. A transmitter address (TA) field 113 is the address of the STA transmitting the Trigger frame. A Padding field 116 extends the frame length to give the recipient STAs more time to prepare a response.

A Common Info field 114 may include at least one of following subfields in the Table 3.

TABLE 3

| Subfields | Bits | Description |
| --- | --- | --- |
| Trigger Type | 4 | indicates the type of the Trigger frame. |
| Length | 12 | indicates the value of the L-SIG Length field of the HE TB PPDU that is the response to the Trigger frame |
| CS required | 1 | Set to 1 to indicate that the STAs identified in the User Info fields are required to sense the medium and to consider the medium state and the NAV in determining whether or not to respond. The CS Required subfield is set to 0 to indicate that the STAs identified in the User Info fields are not required to consider the medium state or the NAV in determining whether or not to respond. |
| Bandwidth | 2 | indicates the bandwidth in the HE-SIG-A of the HE TB PPDU. E.g. 20 MHz, 40 MHz, 80 MHz, 80 + 80 MHz or 160 MHz |
| GI And LTF Type | 2 | indicates the GI and HE-LTF type of the HE TB PPDU response. |

The Trigger Type subfield indicates the type of the Trigger frame. The Trigger Type subfield encoding is defined in the below.

TABLE 4

| Trigger Type field value | Description |
| --- | --- |
| 0 | Basic Trigger |
| 1 | Beamforming Report Poll Trigger |
| 2 | MU-BAR |
| 3 | MU-RTS |
| 4-15 | Reserved |

The Trigger frame may include one or more User Info fields 115 addressed to the recipient STAs. For recipient STAs that are associated with the AP, the User Info field is addressed to a recipient STA if the value of the User Identifier subfield of the User Info field is equal to the AID of the STA.

The User Info field 115 may include at least one of following subfields in the Table 5.

TABLE 5

| Subfields | Bits | Description |
| --- | --- | --- |
| AID | 12 | indicates the AID of the STA allocated the resource unit (RU) to transmit the MPDU(s) in the HE TB PPDU, except for an AID equal to 0 which identifies a wildcard RU for random access. |
| RU allocation | 8 | indicates the RU used by the HE TB PPDU of the STA identified by the User Identifier subfield. |
| Coding Type | | indicates the code type of the HE TB PPDU response of the STA identified by the User Identifier subfield. |
| MCS | | indicates the MCS of the HE TB PPDU response of the STA identified by the User Identifier subfield. |
| DCM | | indicates dual carrier modulation of the HE TB PPDU response of the STA identified by the User Identifier subfield. |
| Spatial Stream allocation | | indicates the spatial streams of the HE TB PPDU response of the STA identified by User Identifier field. |

When the Trigger Type subfield indicates a MU-RTS. The trigger frame may be called as an MU-RTS trigger frame. The RA field of the MU-RTS Trigger frame is set to a broadcast address. The Bandwidth subfield in the Common Info field indicates the total PPDU bandwidth. The RU Allocation subfield in the User Info field addressed to the STA indicates whether the CTS frame is transmitted on 20 MHz channel, 40 MHz channel, 80 MHz channel, 160 MHz channel, or 80+80 MHz channel. The RU Allocation subfield may indicate at least one 20 MHz channel on which the CTS frame is to be transmitted.

Figure 5:
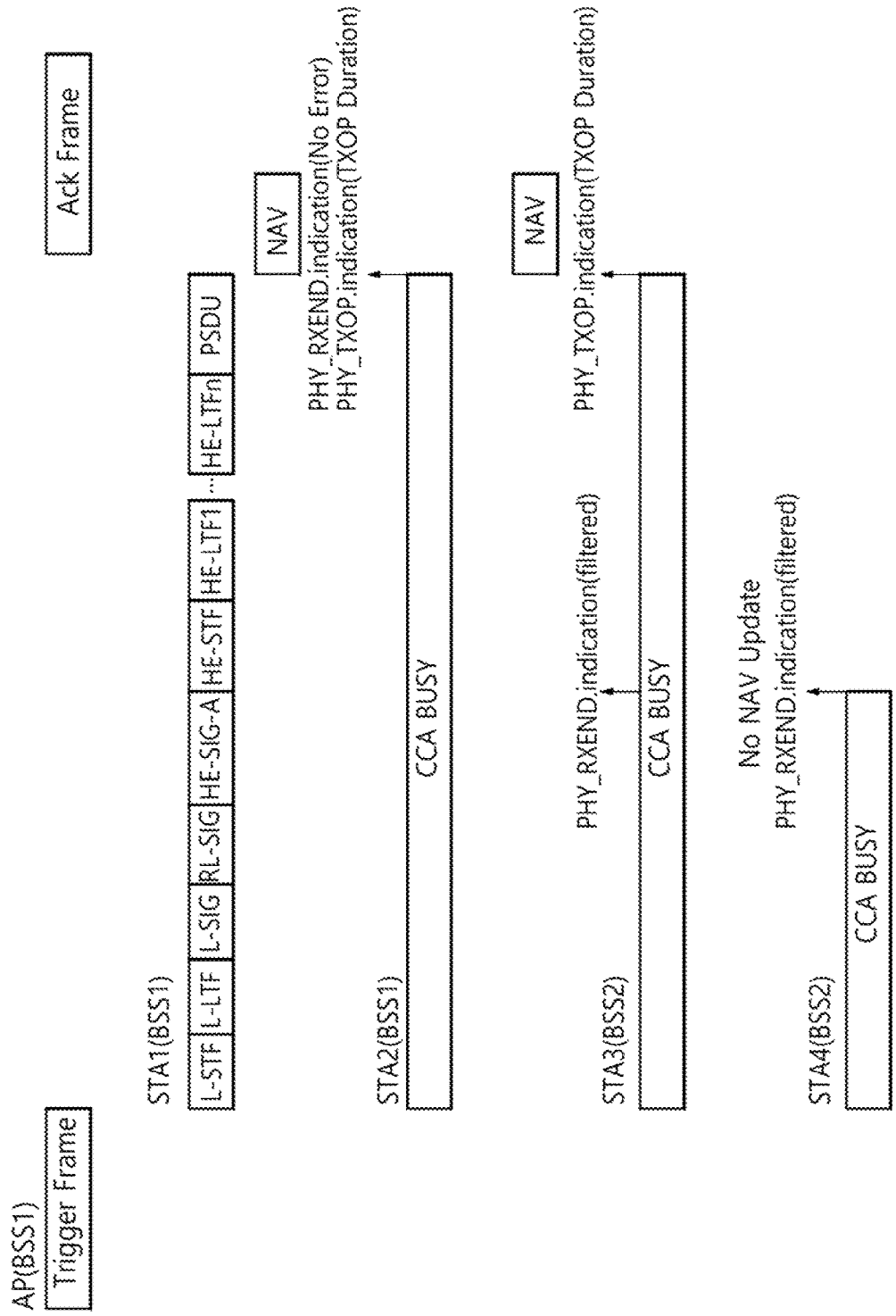
FIG. 5 shows the NAV procedure of HE STA after receiving HE TB PPDU.

FIG. 5 shows the NAV procedure of HE STA after receiving HE TB PPDU.

In a HE TB PPDU, TXTIME in the LENGTH parameter of L-SIG is set as $$TXTIME = T_{LEG\_PREAMBLE} + T_{L-SIG} + T_{RL-SIG} + T_{HE-SIG-A} + T_{HE\_PREAMBLE} + T_{SYM} \cdot N_{SYM} + T_{PE}.$$

In STA 2, because PHY-RXEND.indication primitive and PHY-TXOP.indication primitive are occurred at the end of the PSDU, the NAV is set to either TXOP Duration value indicated in HE-SIG-A or Duration value indicated in MAC header.

In a case of STA 3, after decoding HE-SIG-A, it knows that the received PPDU is destined to OBSS STA. So, it discards the remaining PSDU. In consequence, PHY-RXEND.indication primitive is occurred after HE-SIG-A for a power saving purpose. But, for a protection mechanism, PHY-TXOP.indication primitive is occurred at the end of the RXTIME.

The NAV of STA 3 is set to TXOP Duration value obtained from PHY-TXOP.indication primitive.

In STA 4, after decoding HE-SIG-A, it knows that the received PPDU is destined to OBSS STA. But, because the received signal strength is less than OBSS Packet Detection (OBSS PD) Threshold, it ignores the NAV update and resumes its backoff procedure. PHY-TXOP.indication primitive is not occurred or is occurred with RXVECTOR parameter TXOP_DURATION set to 0.

Figure 6:
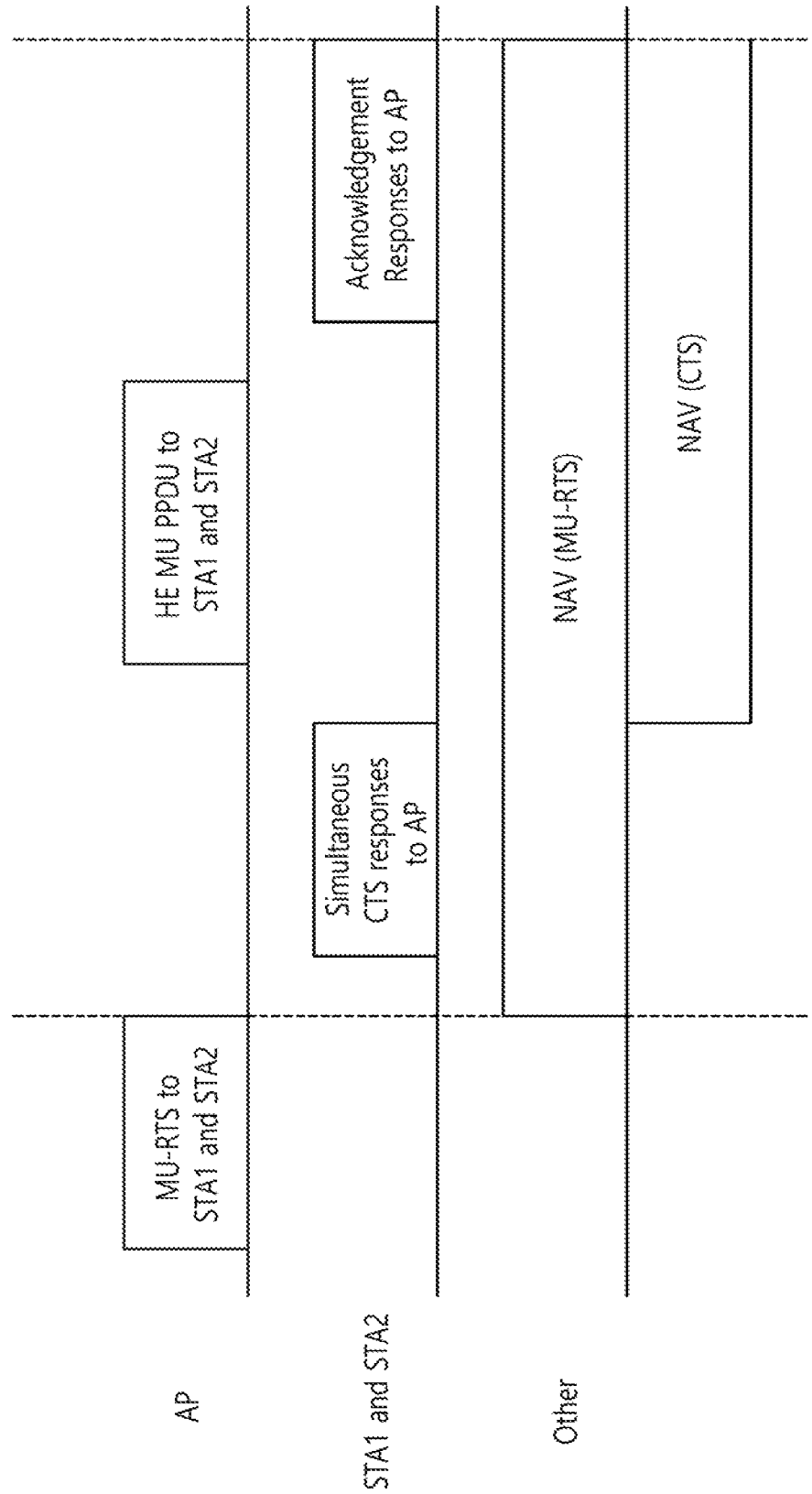
FIG. 6 shows an example of MU-RTS/CTS procedure.

FIG. 6 shows an example of MU-RTS/CTS procedure.

The MU-RTS/CTS procedure allows an AP to initiate a TXOP and protect an MU transmission. An HE AP may transmit an MU-RTS frame to solicit simultaneous CTS responses from one or more HE STAs.

A transmitting STA (i.e. AP) sends a RTS frame to receiving STAs (i.e. STA1 and STA2. The RTS frame may be a MU-RTS trigger frame. As a response to the RTS frame, STA1 and STA2 send CTS frames simultaneously.

The transmitter of an MU-RTS frame shall not request a STA to send a CTS frame response in a 20 MHz channel that is not occupied by the PPDU that contains the MU-RTS frame. In each 20 MHz channel occupied by the PPDU that contains an MU-RTS frame, the transmitter of the MU-RTS frame shall request at least one STA to send a CTS frame response that occupies the 20 MHz channel.

After transmitting an MU-RTS frame, the STA shall wait for a CTSTimeout interval with a value of aSIFSTime+aSlotTime+aRxPHYStartDelay. This interval begins when the MAC receives a PHY-TXEND.confirm primitive. If a PHY-RXSTART.indication primitive does not occur during the CTSTimeout interval, the STA shall conclude that the transmission of the MU-RTS frame has failed, and this STA shall invoke its backoff procedure upon expiration of the CTSTimeout interval. If a PHY-RXSTART.indication primitive does occur during the CTSTimeout interval, the STA shall wait for the corresponding PHY-RXEND.indication primitive to determine whether the MU-RTS frame transmission was successful. The recognition of a valid CTS frame sent by the recipient of the MU-RTS frame, corresponding to this PHY-RXEND.indication primitive, shall be interpreted as successful response, permitting the frame exchange sequence to continue. The recognition of anything else, including any other valid frame, shall be interpreted as failure of the MU-RTS frame transmission.

If an HE STA receives an MU-RTS frame, the HE STA shall commence the transmission of a CTS frame response at the SIFS time boundary after the end of a received PPDU when all the following conditions are met:

The MU-RTS frame has one of the User Info fields addressed to the STA.

The UL MU CS condition indicates the medium is idle. The ED-based CCA during the SIFS after receiving an MU-RTS frame and virtual CS functions are used to determine the state of the medium to respond to an MU-RTS frame.

The NAV indicates idle and CCA has been idle for all secondary channels (secondary 20 MHz channel, secondary 40 MHz channel, and secondary 80 MHz channel) in the channel width indicated by the RU Allocation subfield in the User Info of the MU-RTS frame for a PIFS prior to the start of an MU-RTS frame.

The RU Allocation subfield in the User Info field addressed to the STA indicates either the primary 20 MHz channel, primary 40 MHz channel, primary 80 MHz channel, 160 MHz channel, or 80+80 MHz channel.

The MU RTS frame is sent by the AP with which the STA is associated and the value of the regular NAV is 0.

The CTS frame sent in response to an MU-RTS frame is carried in a non-HT or non-HT duplicate PPDU.

Figure 7:
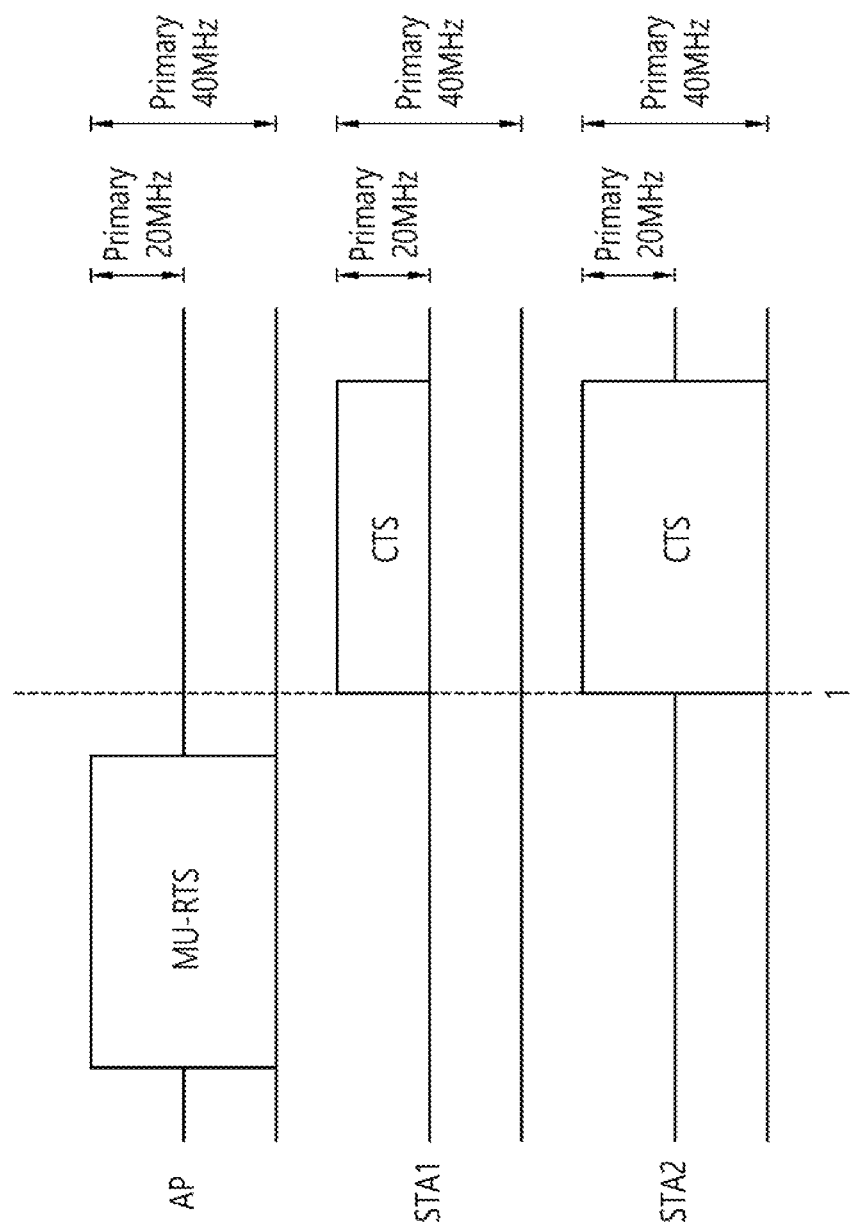
FIG. 7 shows an example of an MU-RTS Trigger frame soliciting CTS frames.

FIG. 7 shows an example of an MU-RTS Trigger frame soliciting CTS frames. In this example, MU-RTS Trigger frame is transmitted in a 40 MHz non-HT duplicate PPDU on the primary 40 MHz channel. Further, the MU-RTS Trigger frame requests STA1 to transmit a CTS frame response on the primary 20 MHz channel and STA2 to transmit a CTS frame response on the primary 40 MHz channel.

A frame exchange, in the context of multiple frame transmission in an EDCA TXOP, may be one of the following:

A frame not requiring immediate acknowledgment (such as a group addressed frame or a frame transmitted with an acknowledgment policy that does not require immediate acknowledgment) or an A-MPDU containing only such frames A frame requiring acknowledgment (such as an individually addressed frame transmitted with an acknowledgment policy that requires immediate acknowledgment) or an A-MPDU containing at least one such frame, followed after SIFS by a corresponding acknowledgment frame Either
    a VHT NDP Announcement frame followed after SIFS by a VHT NDP followed after SIFS by a PPDU containing one or more VHT Compressed Beamforming frames, or
    a Beamforming Report Poll frame followed after SIFS by a PPDU containing one or more VHT Compressed Beamforming frames
    a HE NDP Announcement frame followed after SIFS by a HE NDP followed after SIFS by a PPDU containing one or more HE Compressed Beamforming frames, or
    a Beamforming Report Poll frame followed after SIFS by a PPDU containing one or more HE Compressed Beamforming frames After a valid response to the initial frame of a TXOP, if the Duration/ID field is set for multiple frame transmission and there is a subsequent transmission failure, the corresponding channel access function may transmit after the CS mechanism indicates that the medium is idle at the TxPIFS slot boundary provided that the duration of that transmission plus the duration of any expected acknowledgment and applicable IFS is less than the remaining TXNAV timer value and. At the expiration of the TXNAV timer, if the channel access function has not regained access to the medium, then the EDCAF shall invoke the backoff procedure. All other channel access functions at the STA shall treat the medium as busy until the expiration of the TXNAV timer.

If a TXOP is protected by an RTS or CTS frame carried in a non-HT or a non-HT duplicate PPDU, the TXOP holder sets the TXVECTOR parameter CH_BANDWIDTH of a PPDU as follows:

To be the same or narrower than RXVECTOR parameter CH_BANDWIDTH_IN_NON_HT of the last received CTS frame in the same TXOP, if the RTS frame with a bandwidth signaling TA and TXVECTOR parameter DYN_BANDWIDTH_IN_NON_HT set to Dynamic has been sent by the TXOP holder in the last RTS/CTS exchange.

Otherwise, to be the same or narrower than the TXVECTOR parameter CH_BANDWIDTH of the RTS frame that has been sent by the TXOP holder in the last RTS/CTS exchange in the same TXOP.

If there is no RTS/CTS and no MU-RTS/CTS exchange in non-HT duplicate format in a TXOP, and the TXOP includes at least one non-HT duplicate frame exchange that does not include a PS-Poll, then the TXOP holder shall set the CH_BANDWIDTH parameter in TXVECTOR of a PPDU sent after the first non-HT duplicate frame that is not a PS-Poll to be the same or narrower than the CH_BANDWIDTH parameter in TXVECTOR of the initial frame in the first non-HT duplicate frame exchange in the same TXOP.

If a TXOP is protected by an MU-RTS or CTS frame carried in a non-HT or a non-HT duplicate PPDU, the TXOP holder sets the TXVECTOR parameter CH_BANDWIDTH of a PPDU as follows:

To be the same or narrower than the TXVECTOR parameter CH_BANDWIDTH of the MU-RTS frame that has been sent by the TXOP holder in the last MU-RTS/CTS exchange in the same TXOP if the RU Allocation subfields in each User Info fields of the MU-RTS for all recipient STAs represent same bandwidth value specified as the bandwidth subfield in the Common Info field of the MU-RTS that indicates the TXVECTOR parameter CH_BANDWIDTH of the MU-RTS (i.e., the total PPDU bandwidth of a MU-RTS)

Otherwise, to be the same or narrower than the TXVECTOR parameter CH_BANDWIDTH of the preceding PPDU that it has transmitted in the same TXOP.

When a TXOP is initiated with MU-RTS/CTS, it is proposed that a transmission bandwidth of a PPDU within the TXOP is determined by comparing bandwidths given by MU-RTS. When the bandwidth value specified in the MU-RTS is equal to the bandwidth value for all RU Allocation subfields in the MU-RTS, the transmission bandwidth of the PPDU may be set to a value equal to or smaller than the bandwidth value specified in the MU-RTS. Otherwise, the transmission bandwidth of the PPDU is set to a value equal to or smaller than that is equal to or smaller than a bandwidth value of a preceding PPDU in the TXOP.

If there is no non-HT duplicate frame exchange in a TXOP, the TXOP holder shall set the TXVECTOR parameter CH_BANDWIDTH of a non-initial PPDU to be the same or narrower than the TXVECTOR parameter CH_BANDWIDTH of the preceding PPDU that it has transmitted in the same TXOP, except when the preceding PPDU that it has received is an HE trigger-based PPDU (i.e., the non-initial PPDU is a following frame of an HE trigger-based PPDU). In such case, the TXOP holder shall set the TXVECTOR parameter CH_BANDWIDTH of a non-initial PPDU as follows:

To be the same or narrower than the TXVECTOR parameter CH_BANDWIDTH of the preceding PPDU that it has transmitted in the same TXOP if the TXVECTOR parameter CH_BANDWIDTH of the preceding PPDU that it has transmitted is equal to the RXVECTOR parameter CH_BANDWIDTH of the preceding PPDU (i.e., the HE trigger-based PPDU) that it has received in the same TXOP.

Otherwise, to be the same or narrower than the RXVECTOR parameter CH_BANDWIDTH of the preceding PPDU (i.e., the HE trigger-based PPDU) that it has received in the same TXOP.

Regarding a second bullet, the TXOP holder shall set the TXVECTOR parameter CH_BANDWIDTH of a non-initial PPDU to be the same or narrower than the RXVECTOR parameter CH_BANDWIDTH of the preceding PPDU (i.e., the HE trigger-based PPDU) that it has received in the same TXOP. But, if the RXVECTOR parameter CH_BAND-WIDTH of the preceding PPDU (i.e., the HE trigger-based PPDU) that it has received in the same TXOP indicates an empty, the TXOP holder shall perform a PIFS recovery procedure as the following:

Transmit a 160 MHz or 80+80 MHz mask PPDU if the secondary channel, the secondary 40 MHz channel, and the secondary 80 MHz channel were idle during an interval of PIFS.

Transmit an 80 MHz mask PPDU on the primary 80 MHz channel if both the secondary channel and the secondary 40 MHz channel were idle during an interval of PIFS immediately preceding the start of the TXOP.

Transmit a 40 MHz mask PPDU on the primary 40 MHz channel if the secondary channel was idle during an interval of PIFS immediately preceding the start of the TXOP.

Transmit a 20 MHz mask PPDU on the primary 20 MHz channel.

Restart the channel access attempt by invoking the back-off procedure as though the medium is busy on the primary channel as indicated by either physical or virtual CS and the backoff timer has a value of 0.

Figure 8:
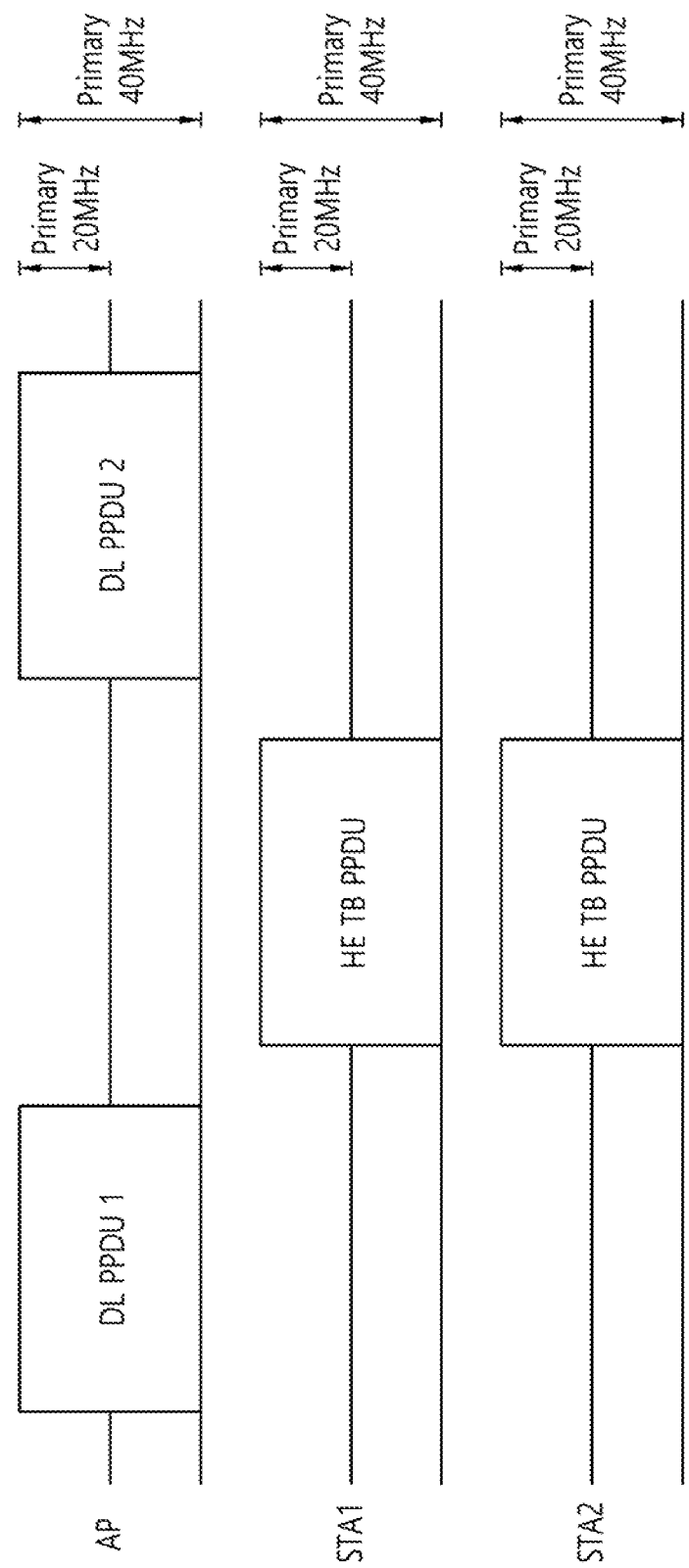
FIG. 8 shows an example of adjusting a bandwidth.

FIG. 8 shows an example of adjusting a bandwidth. The TXVECTOR parameter CH_BANDWIDTH of DL PPDU2 is the same or narrower than the TXVECTOR parameter CH_BANDWIDTH (i.e., 40 MHz) of the preceding PPDU (i.e., DL PPDU1) that it has transmitted in the same TXOP. Because the TXVECTOR parameter CH_BANDWIDTH (i.e., 40 MHz) of the preceding PPDU (i.e., DL PPDU1) that it has transmitted is equal to the RXVECTOR parameter CH_BANDWIDTH (i.e., 40 MHz) of the preceding PPDU (i.e., the HE trigger-based PPDU) that it has received in the same TXOP.

Figure 9:
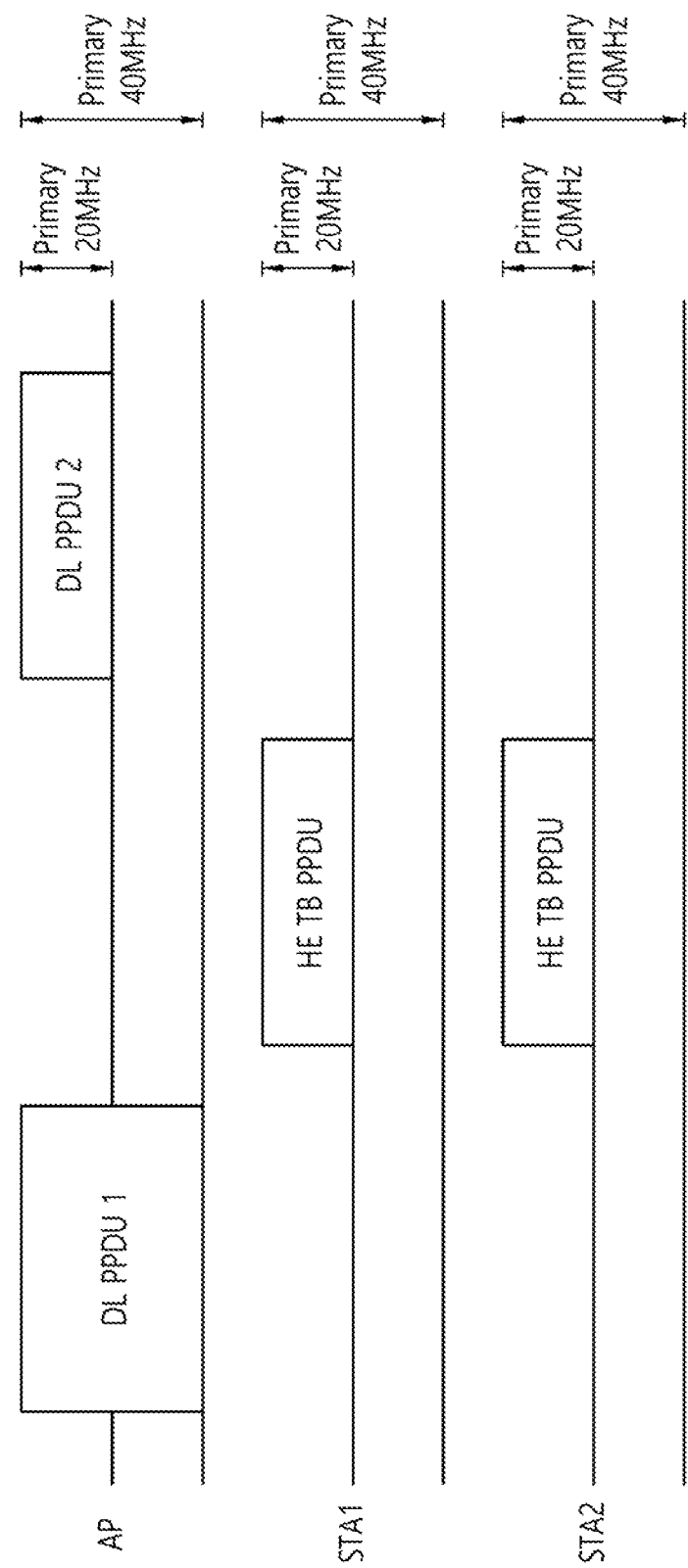
FIG. 9 shows another example of adjusting a bandwidth.

FIG. 9 shows another example of adjusting a bandwidth. The TXVECTOR parameter CH_BANDWIDTH of DL PPDU2 is the same or narrower than the RXVECTOR parameter CH_BANDWIDTH (i.e., 20 MHz) of the preceding PPDU (i.e., HE trigger-based PPDU) that it has received in the same TXOP. Because the TXVECTOR parameter CH_BANDWIDTH (i.e., 40 MHz) of the preceding PPDU (i.e., DL PPDU1) that it has transmitted is not equal to the RXVECTOR parameter CH_BANDWIDTH (i.e., 20 MHz) of the preceding PPDU (i.e., the HE trigger-based PPDU) that it has received in the same TXOP.

In order to reduce an implementation complexity, on the behalf of checking the RXVECTOR parameters of the preceding PPDU (i.e., the HE trigger-based PPDU) that it has received, the TXOP holder can set the TXVECTOR parameter CH_BANDWIDTH of the non-initial PPDU to be the same or narrower than the RXVECTOR parameter CH_BANDWIDTH of the preceding PPDU (i.e., the HE trigger-based PPDU) that it has received in the same TXOP.

The TXVECTOR parameter CH_BANDWIDTH of the HE trigger-based PPDU may always be same with the TXVECTOR parameter CH_BANDWIDTH of its preceding PPDU (i.e., trigger frame). If there is no non-HT duplicate frame exchange in a TXOP, the TXOP holder shall set the TXVECTOR parameter CH_BANDWIDTH of a non-initial PPDU to be the same or narrower than the TXVECTOR parameter CH_BANDWIDTH of the preceding PPDU that it has transmitted in the same TXOP, except when the preceding PPDU that it has received is an HE trigger-based PPDU (i.e., the non-initial PPDU is a following frame of an HE trigger-based PPDU). In such case, the TXOP holder shall set the TXVECTOR parameter CH_BANDWIDTH of a non-initial PPDU as follows:

To be the same or narrower than the TXVECTOR parameter CH_BANDWIDTH of the preceding PPDU that it has transmitted in the same TXOP if the bandwidth of the pre-HE modulated fields of the preceding PPDU (i.e., the HE trigger-based PPDU) that it has received in the same TXOP is equal to the RXVECTOR parameter CH_BANDWIDTH of the preceding PPDU (i.e., the HE trigger-based PPDU) that it has received in the same TXOP.

Otherwise, to be the same or narrower than the bandwidth of the pre-HE modulated fields of the preceding PPDU (i.e., the HE trigger-based PPDU) that it has received in the same TXOP that it has received in the same TXOP.

The bandwidth of the pre-HE modulated fields of the HE trigger-based PPDU that it has received can be obtained from the RXVECTOR parameter RU_ALLOCATION.

If there is no non-HT duplicate frame exchange in a TXOP, the TXOP holder shall set the TXVECTOR parameter CH_BANDWIDTH of a non-initial PPDU to be the same or narrower than the TXVECTOR parameter CH_BANDWIDTH of the preceding PPDU that it has transmitted in the same TXOP.

Figure 10:
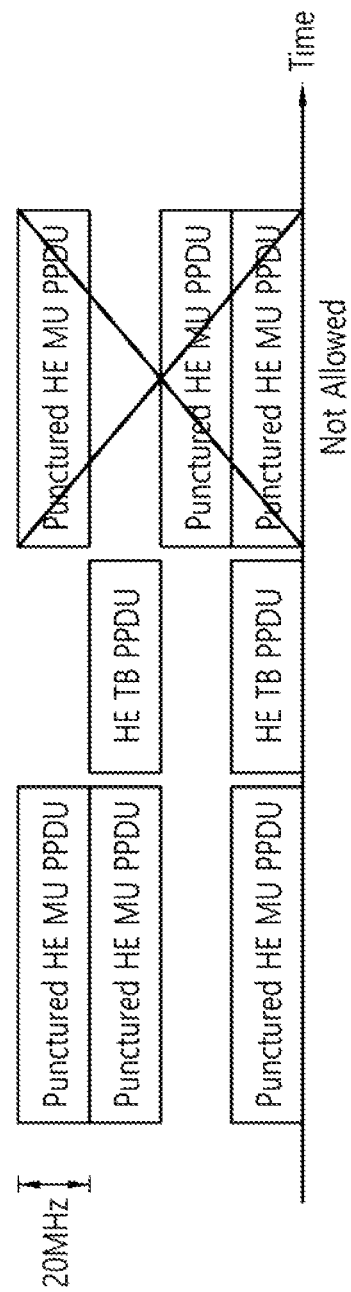
FIG. 10 shows an example of a punctured PPDU.

FIG. 10 shows an example of a punctured PPDU.

A punctured PPDU is a PPDU which is transmitted on at least one non-contiguous channel. For example, it is assumed that there are four 20 MHz channels. A normal PPDU can be sent on one or more consecutive channels. The normal PPDU uses only three consecutive 20 MHz channels in 60 MHz transmission. A punctured PPDU uses any three 20 MHz channels of the four 20 MHz channels in 60 MHz transmission.

For a punctured HE MU PPDU, TXVECTOR parameter CH_BANDWIDTH is defined as the following: a) set to first state for preamble puncturing in 80 MHz, where in the preamble only the secondary 20 MHz is punctured, b) set to second state for preamble puncturing in 80 MHz, where in the preamble only one of the two 20 MHz sub-channels in secondary 40 MHz is punctured, c) set to third state for preamble puncturing in 160 MHz or 80+80 MHz, where in the primary 80 MHz of the preamble only the secondary 20 MHz is punctured, or d) set to fourth state for preamble puncturing in 160 MHz or 80+80 MHz, where in the primary 80 MHz of the preamble the primary 40 MHz is present.

If there is no non-HT duplicate frame exchange in a TXOP, the TXOP holder transmitting an HE MU PPDU with the TXVECTOR parameter CH_BANDWIDTH set to one of punctured states shall set the TXVECTOR parameter RU_ALLOCATION of a non-initial PPDU to be within a set of 20 MHz channels where pre-HE modulated field of the preceding PPDU that it has transmitted in the same TXOP are located.

If there is no non-HT duplicate frame exchange in a TXOP and the preceding PPDU is a punctured HE MU PPDU, the TXVECTOR parameter CH_BANDWIDTH of the non-initial PPDU transmitted from the TXOP holder is set to a value whose corresponding 20 MHz channels are within a set of 20 MHz channels where pre-HE modulated fields of the preceding PPDU are located.

If there is no non-HT duplicate frame exchange in a TXOP and the non-initial PPDU is a punctured HE MU PPDU, the TXVECTOR parameter RU_ALLOCATION of the non-initial PPDU transmitted from the TXOP holder is set to a value whose corresponding RU is within a set of 20 MHz channels where pre-HE modulated fields of the preceding PPDU are located.

If a STA is permitted to begin a TXOP and the STA has at least one MSDU pending for transmission for the AC of the permitted TXOP, the STA may perform one of the following actions:

a) Transmit a 160 MHz or 80+80 MHz mask PPDU if the secondary channel, the secondary 40 MHz channel, and the secondary 80 MHz channel were idle during an interval of PIFS immediately preceding the start of the TXOP.

b) Transmit an 80 MHz mask PPDU on the primary 80 MHz channel if both the secondary channel and the secondary 40 MHz channel were idle during an interval of PIFS immediately preceding the start of the TXOP.

c) Transmit a 40 MHz mask PPDU on the primary 40 MHz channel if the secondary channel was idle during an interval of PIFS for the 5 GHz band and DIFS for an HE STA operating in the 2.4 GHz band immediately preceding the start of the TXOP.

d) Transmit a 20 MHz mask PPDU on the primary 20 MHz channel.

e) Restart the channel access attempt by invoking the backoff procedure as though the medium is busy on the primary channel as indicated by either physical or virtual CS and the backoff timer has a value of 0.

f) Transmit a punctured HE MU PPDU with TXVECTOR parameter CH_BANDWIDTH equal to the first state if the primary channel and the secondary 40 MHz channel were idle during an interval of PIFS immediately preceding the start of the TXOP.

g) Transmit a punctured HE MU PPDU with TXVECTOR parameter CH_BANDWIDTH equal to the second state if the primary channel, the secondary 20 MHz channel, and one of the two 20 MHz sub-channels in secondary 40 MHz were idle during an interval of PIFS immediately preceding the start of the TXOP.

h) Transmit a punctured HE MU PPDU with TXVECTOR parameter CH_BANDWIDTH equal to the third state if the primary channel, the secondary 40 MHz channel, and at least one of the four 20 MHz sub-channels in the secondary 80 MHz channel were idle during an interval of PIFS immediately preceding the start of the TXOP.

i) Transmit a punctured HE MU PPDU with TXVECTOR parameter CH_BANDWIDTH equal to the fourth state if the primary channel, the secondary 20 MHz channel, and at least one of the four 20 MHz sub-channels in the secondary 80 MHz channel were idle during an interval of PIFS immediately preceding the start of the TXOP.

If a TXOP is protected by a CTS-to-self frame carried in a non-HT or non-HT duplicate PPDU, the TXOP holder shall set the TXVECTOR parameter CH_BANDWIDTH of a PPDU to be the same or narrower than the TXVECTOR parameter CH_BANDWIDTH of the CTS-to-self frame in the same TXOP.

Table 6 shows the TXVECTOR parameter CH_BANDWIDTH for HE STA.

TABLE 6

| Condition | Value |
|---|---|
| FORMAT is HE_SU or HE_EXT_SU | Indicates the channel width of the transmitted PPDU. Enumerated type: CBW20 for 20 MHz CBW40 for 40 MHz CBW80 for 80 MHz CBW160 for 160 MHz CBW80 + 80 for 80 + 80 MHz |
| FORMAT is HE_MU | Indicates the channel occupied by the transmitted PPDU, supporting channel bonding. CBW20 for 20 MHz CBW40 for 40 MHz CBW80 for 80 MHz CBW160 for 160 MHz CBW80 + 80 for 80 + 80 MHz |
| FORMAT is HE_TRIG | In TXVECTOR, indicates the channel width of all transmitted HE trigger-based PPDUs addressed to the same AP. In RXVECTOR, indicates the estimated channel width of the received PPDU. Enumerated type: CBW20 for 20 MHz CBW40 for 40 MHz CBW80 for 80 MHz CBW160 for 160 MHz CBW80 + 80 for 80 + 80 MHz NOTE-TXVECTOR parameter CH_BANDWIDTH does not determine the channel width of the transmitted PPDU. But it determines the transmit spectrum mask. For example, A 20 MHz mask PPDU is used if CBW20 is set. A 40 MHz mask PPDU is used if CBW40 is set. A 80 MHz mask PPDU is used if CBW80 is set. A 160 MHz mask PPDU is used if CBW160 is set. A 80 + 80 MHz mask PPDU is used if CBW80 + 80 is set. |
| FORMAT is NON_HT | In TXVECTOR, indicates the channel width of the transmitted PPDU. In RXVECTOR, indicates the estimated channel width of the received PPDU. Enumerated type: CBW40, CBW80, CBW160, or CBW80 + 80 if NON_HT_MODULATION equals NON_HT_DUP_OFDM. CBW20 if NON_HT_MODULATION equals OFDM. |
| FORMAT is HE_MU | In TXVECTOR, each 8 bit per 20 MHz BW indicates the RU arrangement in frequency domain that is addressed for each recipient |

TABLE 6-continued

| Condition | Value |
|---|---|
| FORMAT is HE_TRIG | STA per 20 MHz BW.<br>In RXVECTOR, 8 bit indicates the RU arrangement in frequency domain that is addressed to the receiving STA.<br>In TXVECTOR, 8 bit indicates the RU arrangement in frequency domain that is addressed to the recipient STA (i.e., AP).<br>In RXVECTOR, each 8 bit per 20 MHz BW indicates the RU arrangement in frequency domain that is addressed from each transmitting STA per 20 MHz BW to the recipient STA. |

When the FORMAT of the received PPDU is RE_TRIG (i.e., the HE trigger-based PPDU), the STA decides the estimated channel width as the following:

The RXVECTOR parameter CH_BANDWIDTH is set to CBW20 if the primary 20 MHz channel is occupied by the pre-HE modulated fields of the received HE_TRIG PPDU.

The RXVECTOR parameter CH_BANDWIDTH is set to CBW40 if the primary 20 MHz channel and the secondary 20 MHz channel are occupied by the pre-HE modulated fields of the received HE_TRIG PPDU.

The RXVECTOR parameter CH_BANDWIDTH is set to CBW80 if the primary 20 MHz channel, the secondary 20 MHz channel and the secondary 40 MHz channel are occupied by the pre-HE modulated fields of the received HE_TRIG PPDU.

The RXVECTOR parameter CH_BANDWIDTH is set to CBW160 or CBW80+80 if the primary 20 MHz channel, the secondary 20 MHz channel, the secondary 40 MHz channel and the secondary 80 MHz channel are occupied by the pre-HE modulated fields of the received HE_TRIG PPDU.

The RXVECTOR parameter CH_BANDWIDTH is set to empty, otherwise.

If the received HE trigger-based PPDU does not occupy the primary 20 MHz channel, the RXVECTOR parameter CH_BANDWIDTH is set to empty.

If the received HE trigger-based PPDU occupies only the secondary 20 MHz channel, the RXVECTOR parameter CH_BANDWIDTH is set to empty. Because the primary 20 MHz channel is not occupied, the RXVECTOR parameter CH_BANDWIDTH is set to CBW40.

If the received HE trigger-based PPDU occupies only the secondary 40 MHz channel, the RXVECTOR parameter CH_BANDWIDTH is set to empty. Because the primary 20 MHz channel and the secondary 20 MHz channel are not occupied, the RXVECTOR parameter CH_BANDWIDTH is set to CBW80.

If the received HE trigger-based PPDU occupies only the secondary 80 MHz channel, the RXVECTOR parameter CH_BANDWIDTH is set to empty. Because the primary 20 MHz channel, the secondary 20 MHz channel and the secondary 40 MHz channel are not occupied, the RXVECTOR parameter CH_BANDWIDTH is set to CBW160 or CBW80+80.

When the FORMAT of the received PPDU is NON_HT, the STA decides the estimated channel width as the following:

The RXVECTOR parameter CH_BANDWIDTH is set to CBW20 if the primary 20 MHz channel is occupied by the received (duplicated) NON_HT_PPDU.

The RXVECTOR parameter CH_BANDWIDTH is set to CBW40 if the secondary 20 MHz channel is occupied by the received (duplicated) NON_HT_PPDU.

The RXVECTOR parameter CH_BANDWIDTH is set to CBW80 if the secondary 40 MHz channel is occupied by the received (duplicated) NON_HT_PPDU.

The RXVECTOR parameter CH_BANDWIDTH is set to either CBW160 or CBW80+80 if the secondary 80 MHz channel is occupied by the received (duplicated) NON_HT_PPDU.

When the FORMAT of the received PPDU is NON_HT, for enhancing the reliability of the estimated channel width, the STA can additionally consider the occupancy of the primary 20 MHz channel as the following:

The RXVECTOR parameter CH_BANDWIDTH is set to CBW20 if the primary 20 MHz channel is occupied by the received (duplicated) NON_HT_PPDU.

The RXVECTOR parameter CH_BANDWIDTH is set to CBW40 if both the primary 20 MHz channel and the secondary 20 MHz channel are occupied by the received (duplicated) NON_HT_PPDU.

The RXVECTOR parameter CH_BANDWIDTH is set to CBW80 if both the primary 20 MHz channel and the secondary 40 MHz channel are occupied by the received (duplicated) NON_HT_PPDU.

The RXVECTOR parameter CH_BANDWIDTH is set to either CBW160 or CBW80+80 if both the primary 20 MHz channel and the secondary 80 MHz channel are occupied by the received (duplicated) NON_HT_PPDU.

Figure 11:
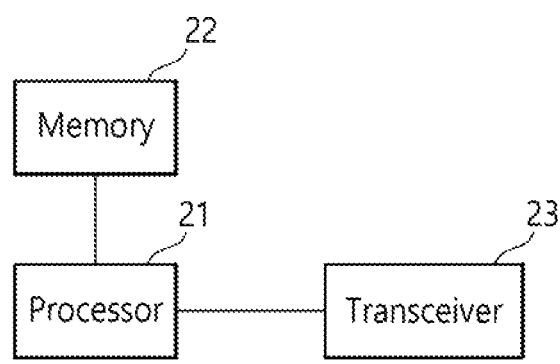
FIG. 11 shows a block diagram of a device to implement embodiments of the present invention.

FIG. 11 shows a block diagram of a device to implement embodiments of the present invention.

A device may include a processor 21, a memory 22, and a transceiver 23. The processor 21 implements an operation of the STA according to the embodiment of the present invention. The processor 21 may generate a PPDU according to an embodiment of the present invention and may instruct the transceiver 23 to transmit the PPDU. The memory 22 stores instructions for the operation of the processor 21. The stored instructions may be executed by the processor 21 and may be implemented to perform the aforementioned operation of the STA. The transceiver 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a physical layer protocol data unit (PPDU) in a transmission opportunity (TXOP), the method comprising:
   transmitting, by a transmitting station, a request to send (RTS) frame for initiating the TXOP to a plurality of receiving stations, the RTS frame including a bandwidth field and a plurality of allocation fields, the bandwidth field indicating a first bandwidth in which the RTS frame is transmitted, each allocation field indicating a second bandwidth in which a clear to send (CTS) frame is to be sent by a corresponding receiving station;
   receiving, by the transmitting station, a plurality of clear to send (CTS) frames as a response to the RTS frame from the plurality of receiving stations;
   determining, by the transmitting station, a transmission bandwidth of a PPDU to be sent based on the first bandwidth and the second bandwidth; and
   transmitting, by the transmitting station, the PPDU in the determined transmission bandwidth during the TXOP,
   wherein, when the second bandwidths for all of the plurality of allocation fields are equal to the first bandwidth, the transmission bandwidth of the PPDU is set to a bandwidth equal to or narrower than the first bandwidth.

2. The method of claim 1, wherein, when the second bandwidths for all of the plurality of allocation fields are not equal to the first bandwidth, the transmission bandwidth of the PPDU is set to a bandwidth equal to or narrower than a bandwidth in which a preceding PPDU is transmitted by the transmitting station during the TXOP.

3. The method of claim 1, wherein the plurality of CTS frames are simultaneously received from the plurality of receiving stations.

4. The method of claim 1, wherein the first bandwidth occupies a plurality of 20 MHz channels and the second bandwidth occupies at least one 20 MHz channel of the plurality of 20 MHz channels.

5. The method of claim 1, wherein the first bandwidth is one of 20 MHz, 40 MHz, 80 MHz and 160 MHz.

6. The method of claim 1, wherein the transmitting station is an access point (AP).

7. A device for transmitting a physical layer protocol data unit (PPDU) in a transmission opportunity (TXOP), the device comprising:
   a transceiver configured to receive and transmit radio signals; and
   a processor coupled with the transceiver and configured to:
   control the transceiver to transmit a request to send (RTS) frame for initiating the TXOP to a plurality of receiving stations, the RTS frame including a bandwidth field and a plurality of allocation fields, the bandwidth field indicating a first bandwidth in which the RTS frame is transmitted, each allocation field indicating a second bandwidth in which a clear to send (CTS) frame is to be sent by a corresponding receiving station;
   control the transceiver to receive a plurality of clear to send (CTS) frames as a response to the RTS frame from the plurality of receiving stations;
   determine a transmission bandwidth of a PPDU to be sent based on the first bandwidth and the second bandwidth; and
   control the transceiver to transmit the PPDU in the determined transmission bandwidth during the TXOP,
   wherein, when the second bandwidths for all of the plurality of allocation fields are equal to the first bandwidth, the transmission bandwidth of the PPDU is set to a bandwidth equal to or narrower than the first bandwidth.

8. The device of claim 7, wherein, when the second bandwidths for all of the plurality of allocation fields are not equal to the first bandwidth, the transmission bandwidth of the PPDU is set to a bandwidth equal to or narrower than bandwidth in which a preceding PPDU is transmitted by the transmitting station during the TXOP.

9. The device of claim 7, wherein the plurality of CTS frames are simultaneously received from the plurality of receiving stations.

10. The device of claim 7, wherein the first bandwidth occupies a plurality of 20 MHz channels and the second bandwidth occupies at least one 20 MHz channel of the plurality of 20 MHz channels.

11. The device of claim 7, wherein the first bandwidth is one of 20 MHz, 40 MHz, 80 MHz and 160 MHz.

* * * * *